(12) United States Patent
Takemori

(10) Patent No.: US 12,304,252 B2
(45) Date of Patent: May 20, 2025

(54) PNEUMATIC TIRE

(71) Applicant: The Yokohama Rubber Co., LTD., Tokyo (JP)

(72) Inventor: Ryohei Takemori, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 363 days.

(21) Appl. No.: 17/758,934

(22) PCT Filed: Dec. 10, 2020

(86) PCT No.: PCT/JP2020/046002
§ 371 (c)(1),
(2) Date: Nov. 22, 2022

(87) PCT Pub. No.: WO2021/149388
PCT Pub. Date: Jul. 29, 2021

(65) Prior Publication Data
US 2023/0219378 A1 Jul. 13, 2023

(30) Foreign Application Priority Data
Jan. 21, 2020 (JP) .............................. JP2020-007446

(51) Int. Cl.
*B60C 15/06* (2006.01)
*B60C 15/00* (2006.01)

(52) U.S. Cl.
CPC ...... *B60C 15/0607* (2013.01); *B60C 15/0036* (2013.01); *B60C 15/06* (2013.01);
(Continued)

(58) Field of Classification Search
CPC . B60C 15/06; B60C 15/0603; B60C 15/0607; B60C 2015/061;
(Continued)

(56) References Cited

U.S. PATENT DOCUMENTS 3,052,275 A  9/1962 Hylbert, Jr.
2017/0274710 A1* 9/2017 Matsumoto ........... B60C 9/2204

FOREIGN PATENT DOCUMENTS

CN  110062705 A  7/2019
JP  4-5113 A  1/1992
(Continued)

OTHER PUBLICATIONS

Machine Translation: JP-2002200904-A, Asada S, (Year: 2024).*
Machine Translation: JP-2002200905-A, Mori K, (Year: 2024).*
Machine Translation: JP-2007045333-A, Kurematsu N, (Year: 2024).*

*Primary Examiner* — Kendra Ly
(74) *Attorney, Agent, or Firm* — Thorpe North & Western

(57) ABSTRACT

In a pneumatic tire including a bead core, a first bead filler on an outer circumference of the bead core, a carcass turned up from an inner side to an outer side around the bead core and the first bead filler), and a second bead filler on an outer side of a turned up portion of the carcass, a height of an upper end of the first bead filler is 10%-30% of a cross-sectional height, a turned up end of the carcass is on a radially outer side of a maximum width position, an upper end of the second bead filler is between the upper end and the turned up end, the second bead filler has a shape tapered toward the radially outer side, and thicknesses G1 to G3 of the second bead filler at predetermined positions satisfy $0.5 \leq G2/G1 \leq 0.8$ and $0.4 \leq G3/G1 \leq 0.6$.

16 Claims, 3 Drawing Sheets

(52) U.S. Cl.
CPC .... *B60C 15/0603* (2013.01); *B60C 2015/061* (2013.01); *B60C 2015/0614* (2013.01); *B60C 2015/0621* (2013.01)

(58) Field of Classification Search
CPC .... B60C 2015/0617; B60C 2015/0621; B60C 2015/0625
See application file for complete search history.

(56) References Cited

FOREIGN PATENT DOCUMENTS

| | | | |
|---|---|---|---|
| JP | 2997941 | B2 | 1/2000 |
| JP | 2002200904 | A * | 7/2002 |
| JP | 2002200905 | A * | 7/2002 |
| JP | 2007-45333 | A | 2/2007 |
| JP | 2007045333 | A * | 2/2007 |
| JP | 4211893 | B1 | 1/2009 |
| JP | 2013-244929 | A | 12/2013 |
| JP | 2014-508673 | A | 4/2014 |
| JP | 2019-51861 | A | 4/2019 |
| JP | 2019-111894 | A | 7/2019 |
| WO | WO 2019/069589 | A1 | 4/2019 |

* cited by examiner

PNEUMATIC TIRE

TECHNICAL FIELD

The present technology relates to a pneumatic tire that is suitable for a tire to be mounted on a sports utility vehicle (SUV) or a minivan and particularly relates to a pneumatic tire that can provide steering stability and ride comfort in a highly compatible manner.

BACKGROUND ART

A pneumatic tire includes a bead filler made of a rubber composition with high degree of hardness disposed on an outer circumference of a bead core. Providing a bead filler improves the steering stability of the pneumatic tire. Unfortunately, enlarging the bead filler acquires the effect of improving the steering stability but decreases other tire performances such as ride comfort. In view of this, adding an auxiliary bead filler in addition to the bead filler to a bead portion to provide steering stability and other tire performances in a compatible manner has been attempted (see, for example, Japan Patent Nos. 2997941 and 4211893, and Japan Unexamined Patent Publication No. 2013-244929).

However, for a pneumatic tire with a relatively high tire cross-sectional height, such as a tire to be mounted on an SUV and a minivan, steering stability and ride comfort in a compatible manner cannot be optimized even with the auxiliary bead filler added.

SUMMARY

The present technology provides a pneumatic tire that can provide steering stability and ride comfort in a highly compatible manner.

A pneumatic tire according to an embodiment of the present technology includes a tread portion extending in a tire circumferential direction and having an annular shape, a pair of sidewall portions respectively disposed on both sides of the tread portion, a pair of bead portions each disposed on an inner side of the pair of sidewall portions in a tire radial direction, a bead core extending in the tire circumferential direction and having an annular shape embedded in each of the bead portions, a first bead filler disposed on an outer circumference of the bead core, the carcass layer turned up from a tire inner side to an outer side around the bead core and the first bead filler at each of the bead portions, and a second bead filler disposed on an outer side of a turned up portion of the carcass layer in a tire width direction.

In the pneumatic tire, a height H1 of an upper end of the first bead filler in the tire radial direction ranges from 10% to 30% of a tire cross-sectional height SH, a turned up end of the carcass layer is disposed on an outer side of a tire maximum width position in the tire radial direction, an upper end of the second bead filler is disposed between the upper end of the first bead filler and the turned up end of the carcass layer in the tire radial direction, the second bead filler has a shape tapered toward the outer side in the tire radial direction, the second bead filler is thickest at a position of the upper end of the first bead filler, and a thickness G1 of the second bead filler at the position of the upper end of the first bead filer, a thickness G2 of the second bead filler at a position corresponding to one-half of a height H4 in the tire radial direction from the upper end of the first bead filler to the upper end of the second bead filler, and a thickness G3 of the second bead filler at position corresponding to three-fourths of the height H4 in the tire radial direction from the upper end of the first bead filler to the upper end of the second bead filler satisfy relationships $0.5 \leq G2/G1 \leq 0.8$ and $0.4 \leq G3/G1 \leq 0.6$.

According to the present technology, setting the height H1 of the upper end of the first bead filler set in the range described above suppresses an increase in vertical spring constant as well as deterioration of ride comfort. Properly setting the positions of the turned up end of the carcass layer and the upper end of the second bead filler ensures sufficient tire circumferential rigidity. Further, forming the second bead filler to have a shape tapered toward the outer side in the tire radial direction and properly setting the thicknesses G1 to G3 at the respective portions of the second bead filler ensures sufficient tire horizontal rigidity. This allows for steering stability and ride comfort to be provided in a highly compatible manner. For a pneumatic tire with relatively high tire cross-sectional height SH, such as a tire to be mounted on an SUV or a minivan, in particular, the steering stability and ride comfort can also be optimized.

In the present technology, a height H3 of the upper end of the second bead filler in the tire radial direction with respect to the height H1 of the upper end of the first bead filler in the tire radial direction and the height H2 of the turned up end of the carcass layer in the tire radial direction preferably satisfies the relationship $H3 > (H1+H2)/2$. Satisfying such a relationship allows the tire circumferential rigidity and the tire horizontal rigidity to be improved effectively.

A height H5 of a lower end of the second bead filler in the tire radial direction preferably ranges from 50% to 75% of the height H1 of the upper end of the first bead filler in the tire radial direction. With the second bead filler appropriately overlapping the first bead filler, sufficient tire horizontal rigidity can be ensured even with the height H1 of the upper end of the first bead filler set to low.

The thickness G1 of the second bead filler at the position of the upper end of the first bead filler is preferably 3.0 mm or more. Setting the thickness G1 of the second bead filler in the range described above allows sufficient tire horizontal rigidity to be ensured.

The cross-sectional area S2 of the second bead filler preferably with respect to the cross-sectional area S1 of the first bead filler satisfies the relationship $1.1 \leq S2/S1 \leq 1.5$. Reducing the cross-sectional area S1 of the first bead filler allows ride comfort (shock absorbing performance) to be improved. On the other hand, enlarging the cross-sectional area S2 of the second bead filler allows for improving ride comfort (vibration damping performance) as well as steering stability (high-speed lane changeability). In view of this, properly setting the ratio S2/S1 allows the steering stability and the ride comfort to be improved in a well-balanced manner.

Preferably, a rim cushion rubber layer is disposed on the outer side of the turned up portion of the carcass layer and the second bead filler in the tire width direction, and a thickness G4 of the rim cushion rubber layer at the position of the upper end of the first bead filler with respect to the thickness G1 of the second bead filler at the position of the upper end of the first bead filler satisfies a relationship $0.5 \leq G4/G1 \leq 1.0$. This allows the sufficient tire horizontal rigidity to be ensured and the steering stability (high-speed lane changeability) to be improved without impairing the ride comfort.

The JIS (Japanese Industrial Standard)-A hardness of the first bead filler and the second bead filler preferably ranges from 72 to 96. Setting the JIS-A hardness of the first bead filler and the second bead filler in the range described above allows the steering stability and the ride comfort to be improved in a well-balanced manner.

Preferably, an outer side surface of the second bead filler includes, in a tire meridian cross-section, a first arc and a second arc projecting toward the outer side in the tire width direction, a height HP of an inflection point between the first arc and the second arc in the tire radial direction with respect to the height H1 of the first bead filler in the tire radial direction and the height H2 of the turned up end of the carcass layer in the tire radial direction satisfies the relationship H1≤HP≤H2/2, and a curvature radius R1 of the first arc positioned on the outer side in the tire radial direction is larger than a radius of curvature R2 of the second arc positioned on the inner side in the tire radial direction. In particular, the radius of curvature R2 of the second arc with respect to the radius of curvature R1 of the first arc preferably satisfies a relationship 0.5≤R2/R1≤0.9. As described above, providing the first arc and the second arc projecting toward the outer side in the tire width direction on the outer side surface of the second bead filler and defining the height HP of the inflection point between the first arc and the second arc as well as the radii of curvature R1 and R2 allows the lateral spring constant to be effectively increased. Thus, the steering stability can be further improved, while favorably maintaining the ride comfort.

The present technology, which is applicable to a pneumatic tire for various applications, is preferably applied to a pneumatic tire having a tire cross-sectional height SH of 135 mm or more, in particular. Such pneumatic tires can provide the steering stability and the ride comfort in a highly compatible manner.

In the present technology, various dimensions are measured with the tire mounted on a regular rim and inflated to a designated air pressure. "Regular rim" refers to a rim defined by standards for each tire according to a system of standards that includes the standards with which tires comply and refers to, for example, a standard rim defined by Japan Automobile Tyre Manufacturers Association (JATMA), "Design Rim" defined by The Tire and Rim Association, Inc. (TRA), or "Measuring Rim" defined by European Tire and Rim Technical Organization (ETRTO). A "designated air pressure" applies 240 kPa.

DETAILED DESCRIPTION

Figure 1:
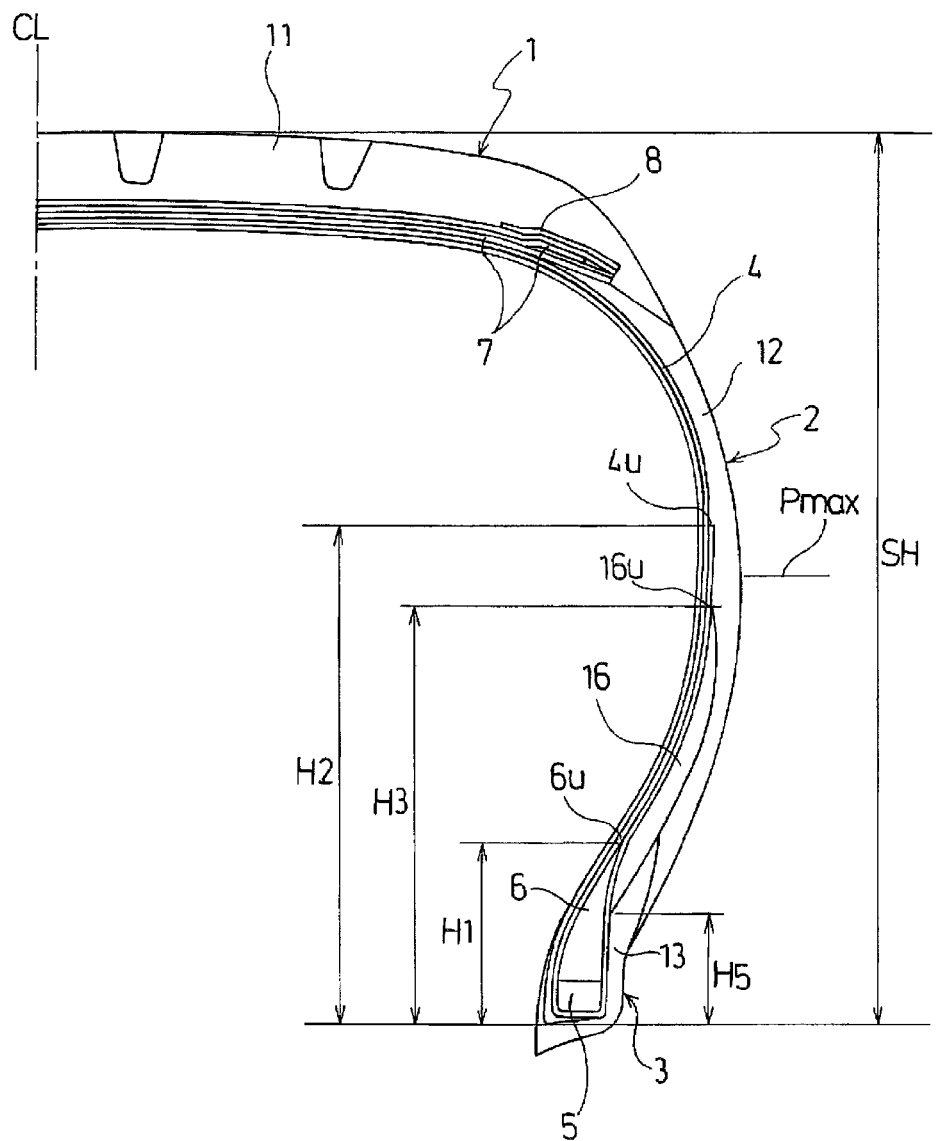
FIG. 1 is a meridian cross-sectional view illustrating a pneumatic tire according to an embodiment of the present technology.
Figure 2:
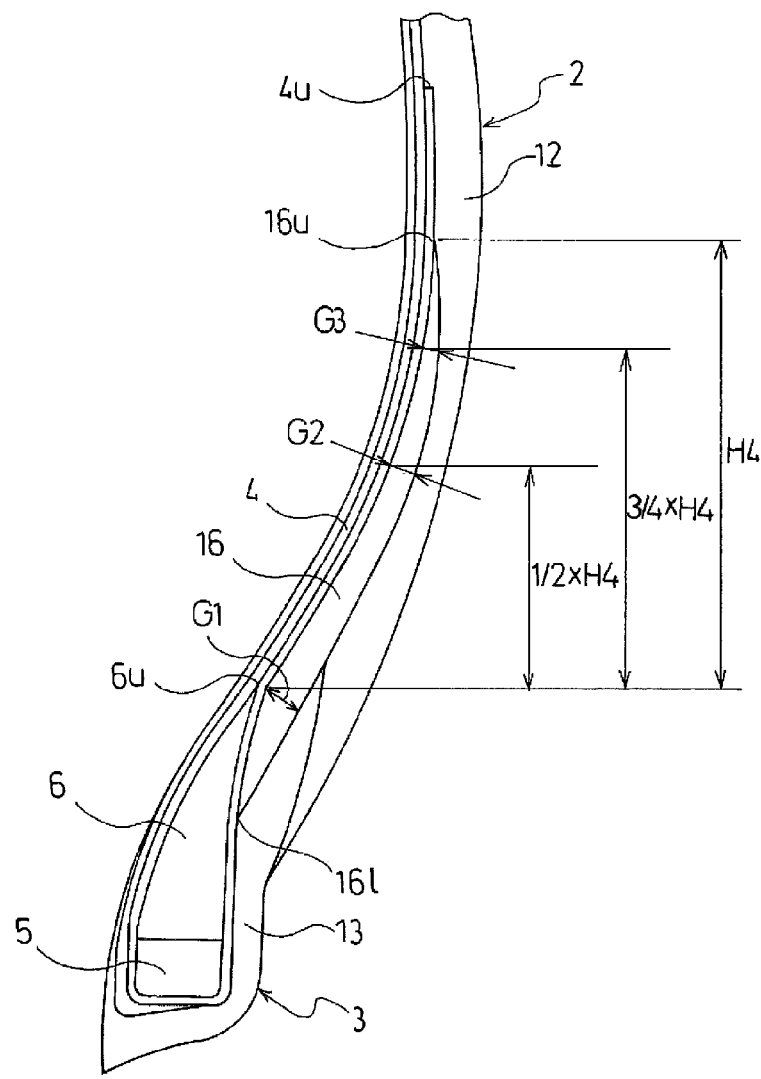
FIG. 2 is a cross-sectional view illustrating a main part of the pneumatic tire of FIG. 1.
Figure 3:
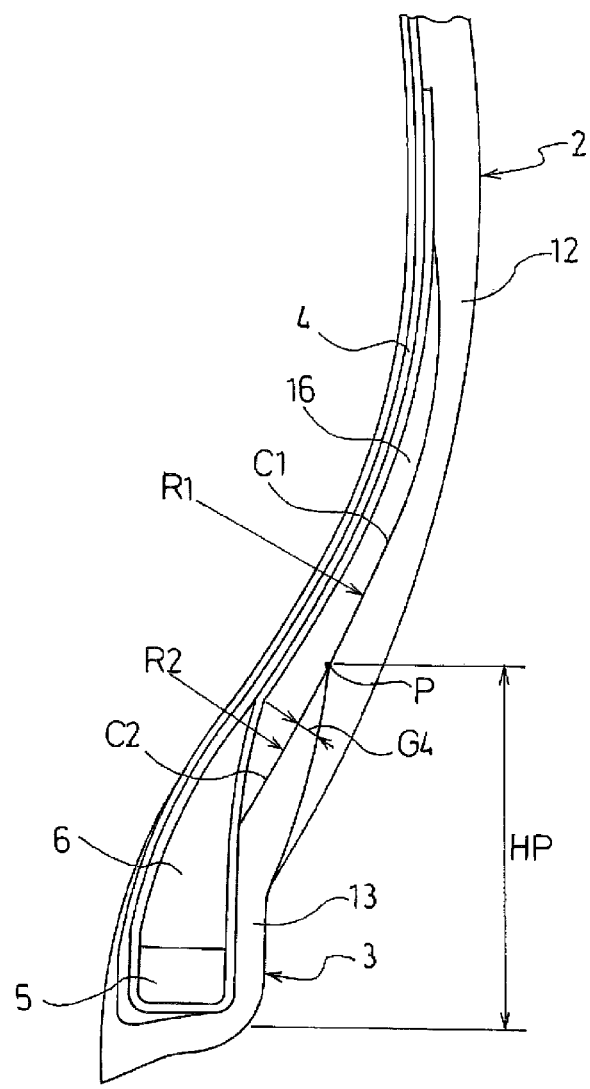
FIG. 3 is another cross-sectional view illustrating the main part of the pneumatic tire in FIG. 1.

Configurations according to embodiments of the present technology will be described in detail below with reference to the accompanying drawings. FIGS. 1 to 3 illustrate a pneumatic tire according to an embodiment of the present technology. Although FIG. 1 illustrates one side of the pneumatic tire from a tire center line CL, the pneumatic tire has a symmetrical or asymmetrical structure on both sides of the tire center line CL.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed on an inner side of the sidewall portions 2 in the tire radial direction.

A carcass layer 4 is mounted between the pair of bead portions 3, 3. A bead core 5 extending in the tire circumferential direction and having an annular shape is embedded in each of the bead portions 3, and a first bead filler 6 made of a rubber composition and having a triangular cross-section is disposed on an outer circumference of the bead core 5. The carcass layer 4 includes a plurality of reinforcing cords extending in the tire radial direction and is turned up, around the bead core 5 and the first bead filler 6 disposed in each of the bead portions 3, from the tire inner side to the outer side. A second bead filler 16 is disposed on the outer side of the turned up portion of the carcass layer 4 in the tire width direction.

On the other hand, a plurality of belt layers 7 are embedded on the outer circumferential side of the carcass layer 4 in the tread portion 1. Each of the belt layers 7 includes a plurality of reinforcing cords that are inclined with respect to the tire circumferential direction, and the reinforcing cords are disposed so as to intersect each other between the layers. In the belt layers 7, the inclination angle of the reinforcing cords with respect to the tire circumferential direction is set in a range of from 10° to 40°, for example. Steel cords are preferably used as the reinforcing cords of the belt layers 7. To improve high-speed durability, at least one belt cover layer 8 formed by arranging reinforcing cords at an angle of, for example, 5° or less with respect to the tire circumferential direction is disposed on an outer circumferential side of the belt layers 7. Organic filament cords such as nylon and aramid are preferably used as the reinforcing cords of the belt cover layer 8.

Furthermore, a tread rubber layer 11 is disposed on the outer circumferential side of the belt cover layer 8 in the tread portion 1. A sidewall rubber layer 12 is disposed on the outer side of the carcass layer 4 in the tire width direction in the sidewall portion 2. A rim cushion rubber layer 13 is disposed on the outer side of the carcass layer 4 in the tire width direction in the bead portion 3.

In the pneumatic tire described above, a height H1 in the tire radial direction of an upper end $6u$ of the first bead filler 6 is set in a range from 10% to 30% of a tire cross-sectional height SH. A turned up end $4u$ of the carcass layer 4 is disposed on the outer side of a tire maximum width position Pmax in the tire radial direction. An upper end $16u$ of the second bead filler 16 is disposed between the upper end $6u$ of the first bead filler 6 and the turned up end $4u$ of the carcass layer 4, in the tire radial direction. Specifically, the height H1 of the upper end $6u$ of the first bead filler 6 in the tire radial direction, a height H2 of the turned up end $4u$ of the carcass layer 4 in the tire radial direction, and a height H3 of the upper end $16u$ of the second bead filler 16 in the tire radial direction satisfy the relationship H1<H3<H2. These heights H1 to H3 are heights from a bead base position on which the tire cross-sectional height SH is based.

The second bead filler 16 has a shape tapered toward the outer side in the tire radial direction, and the second bead filler 16 has the largest thickness at the position of the upper end $6u$ of the first bead filler 6. As illustrated in FIG. 2, a thickness G1 of the second bead filler 16 at the position of the upper end $6u$ of the first bead filler 6, a thickness G2 of the second bead filler 16 at a position corresponding to one-half of a height H4 in the tire radial direction from the upper end $6u$ of the first bead filler 6 to the upper end $16u$ of the second bead filler 16, and a thickness G3 of the second bead filler 16 at a position corresponding to three-fourths of the height H4 in the tire radial direction from the upper end 6u of the first bead filler 6 to the upper end 16u of the second bead filler 16 satisfy relationships $0.5 \leq G2/G1 \leq 0.8$ and $0.4 \leq G3/G1 \leq 0.6$. More preferably, the relationship $0.6 \leq G3/G2 < 1.0$ is further satisfied. The thicknesses G1 to G3 of the second bead filler 16 are measured along the normal direction of the carcass layer 4 from the respective measurement positions.

In the pneumatic tire described above, setting the height H1 of the upper end 6u of the first bead filler 6 in the range described above suppresses an increase in vertical spring constant as well as deterioration of ride comfort. Properly setting the positions of the turned up end 4u of the carcass layer 4 and the upper end 16u of the second bead filler 16 ensures sufficient tire circumferential rigidity. Further, forming the second bead filler 16 to have a shape tapered toward the outer side in the tire radial direction and properly setting the thicknesses G1 to G3 at the respective portions of the second bead filler 16 ensures sufficient tire horizontal rigidity. This allows for steering stability and ride comfort to be provided in a highly compatible manner. For a pneumatic tire with relatively high tire cross-sectional height SH, such as a tire to be mounted on an SUV or a minivan, in particular, the steering stability and ride comfort can also be optimized.

Here, the height H1 of the upper end 6u of the first bead filler 6 in the tire radial direction less than 10% of the tire cross-sectional height SH leads to insufficient tire horizontal rigidity, decreasing the steering stability. On the other hand, the height H1 exceeding 30% of the tire cross-sectional height SH leads to increase in vertical spring constant, degrading ride comfort. The turned up end 4u of the carcass layer 4 being on inner side of the tire maximum width position Pmax in the tire radial direction leads to insufficient tire circumferential rigidity decreasing the steering stability. The upper end 16u of the second bead filler 16 being on the inner side of the upper end 6u of the first bead filler 6 in the tire radial direction leads to insufficient tire circumferential rigidity, resulting in steering stability. The upper end 16u being on the outer side of the turned up end 4u of the carcass layer 4 in the tire radial direction leads to increase in the vertical spring constant, decreasing the ride comfort.

Regarding the thicknesses G1 to G3 at the respective portions of the second bead filler 16, a ratio G2/G1 being smaller than 0.5 leads to insufficient tire horizontal rigidity, resulting in compromised steering stability. On the other hand, the ratio exceeding 0.8 leads to increase in the vertical spring constant, decreasing the ride comfort. A ratio G3/G1 being smaller than 0.4 leads insufficient tire horizontal rigidity, resulting in compromised steering stability. On the other hand, the ratio exceeding 0.6 leads to increase in the vertical spring constant, decreasing the ride comfort.

In the pneumatic tire described above, the height H3 of the upper end 16u of the second bead filler 16 in the tire radial direction with respect to the height H1 of the upper end 6u of the first bead filler 6 in the tire radial direction and the height H2 of the turned up end 4u of the carcass layer 4 in the tire radial direction preferably satisfies the relationship $H3 > (H1+H2)/2$. Satisfying such a relationship allows the tire circumferential rigidity and the tire horizontal rigidity to be improved effectively. In the case of $H3 \leq (H1+H2)/2$, the effect of effectively improving the tire circumferential rigidity and tire horizontal rigidity is decreased.

In the pneumatic tire described above, a height H5 of a lower end 16l of the second bead filler 16 in the tire radial direction preferably ranges from 50% to 75% of the height H1 of the upper end of the first bead filler 6 in the tire radial direction. With the second bead filler 16 appropriately overlapping the first bead filler 6, the sufficient tire horizontal rigidity can be ensured even with the height H1 of the first bead filler 6 set to low. The height H5 of the lower end 16l of the second bead filler 16 being smaller than 50% of the height H1 of the first bead filler 6 leads to increase in vertical spring constant, decreasing the effect of improving the ride comfort. On the other hand, the height H5 exceeding 75% leads to insufficient tire horizontal rigidity, decreasing the effect of improving the steering stability.

In the pneumatic tire described above, the thickness G1 of the second bead filler 16 at the position of the upper end 6u of the first bead filler 6 is preferably 3.0 mm or more. Setting the thickness G1 of the second bead filler 16 set in the range described above allows sufficient tire horizontal rigidity to be ensured. The thickness G1 of the second bead filler 16 at the position of the upper end 6u of the first bead filler 6 being less than 3.0 mm leads to insufficient tire horizontal rigidity, decreasing the effect of improving the steering stability.

In the pneumatic tire described above, a cross-sectional area S2 in a tire meridian cross-section of the second bead filler 16 with respect to a cross-sectional area S1 in a tire meridian cross-section of the first bead filler 6 preferably satisfies relationship $1.1 \leq S2/S1 \leq 1.5$. The cross-sectional area S1 in the tire meridian cross-section of the first bead filler 6 is preferably set in a range from $0.75$ cm$^2$ to $0.95$ cm$^2$. Reducing the cross-sectional area S1 of the first bead filler 6 allows the ride comfort (shock absorbing performance) to be improved. On the other hand, enlarging the cross-sectional area S2 of the second bead filler 16 allows for improving the ride comfort (vibration damping performance) as well as the steering stability (high-speed lane changeability). In view of this, properly setting the ratio S2/S1 allows the steering stability and the ride comfort to be improved in a well-balanced manner. When the ratio S2/S1 falls outside of the range described above, the effect of improving the steering stability and the ride comfort in a well-balanced manner is decreased.

In the pneumatic tire described above, as illustrated in FIG. 3, a thickness G4 of the rim cushion rubber layer 13 at the position of the upper end 6u of the first bead filler 6 at the position of the upper end 6u of the first bead filler 6 with respect to the thickness G1 of the second bead filler 16 at the position of the upper end 6u of the first bead filler 6 preferably satisfies relationship $0.5 \leq G4/G1 \leq 1.0$. The thickness G4 of the rim cushion rubber layer 13 is measured along the normal direction of the carcass layer 4 from the measurement position described above. Properly setting the thickness G4 of the rim cushion rubber layer 13 allows the sufficient tire horizontal rigidity to be ensured and the steering stability (high-speed lane changeability) to be improved without impairing the ride comfort. The ratio G4/G1 being smaller than 0.5 leads to insufficient tire horizontal rigidity, decreasing the effect of improving the steering stability. On the other hand, the ratio G4/G1 exceeding 1.0 leads to the increase in vertical spring constant, decreasing the effect of improving the ride comfort.

In the pneumatic tire described above, JIS-A hardness of each of the first bead filler 6 and the second bead filler 16 preferably ranges from 72 to 96. JIS hardness is the durometer hardness measured in accordance with JIS-K6253 using a type A durometer and under a temperature of 20° C. Setting the JIS-A hardness of the first bead filler 6 and the second bead filler 16 in the range described above allows the steering stability and the ride comfort to be improved in a well-balanced manner. When the JIS-A hardness of the first bead filler 6 and the second bead filler 16 is smaller than 72, the effect of improving the steering stability is decreased. On the other hand, when the JIS-A hardness exceeds 96, the effect of improving the ride comfort is decreased. A difference in hardness between the first bead filler 6 and the second bead filler 16 is preferably as small as possible. Although the JIS-A hardness of the rim cushion rubber layer 13 is set in a range from 65 to 75 for example, the JIS-A hardness of the second bead filler 16 is preferably higher than that of the rim cushion rubber layer 13.

Preferably, as illustrated in FIG. 3, in the pneumatic tire described above, the outer side surface of the second bead filler 16 includes, in a tire meridian cross-section, a first arc C1 and a second arc C2 projecting toward the outer side in the tire width direction, and a height HP of an inflection point P between the first arc C1 and the second arc C2 in the tire radial direction with respect to the height H1 of the first bead filler 6 in the tire radial direction and the height H2 of the turned up end 4u of the carcass layer 4 in the tire radial direction satisfies a relationship H1≤HP≤H2/2, and a radius of curvature R1 of the first arc C1 positioned on the outer side in the tire radial direction is larger than a radius of curvature R2 of the second arc C2 position on the inner side in the tire radial direction. In particular, the radius of curvature R2 of the second arc C2 with respect to the radius of curvature R1 of the first arc C1 preferably satisfies a relationship 0.5≤R2/R1≤0.9. Providing the first arc C1 and the second arc C2 projecting toward the outer side in the tire width direction on the outer side surface of the second bead filler 16, defining the height HP of the inflection point P between the first arc C1 and the second arc C2, and relatively reducing the radius of curvature R2 allows the lateral spring constant to be effectively improved. Thus, the steering stability can be further improved, while favorably maintaining the ride comfort.

When the height HP of the inflection point P between the first arc C1 and the second arc C2 in the tire radial direction is outside the range as described above, the reinforcing effect around the upper end 6u of the first bead filler 6 is decreased, and thus the effect of improving the steering stability is decreased. A ratio R2/R1 smaller than 0.5 leads to excessive reinforcing around the upper end 6u of the first bead filler 6, decreasing the effect of improving the ride comfort. On the other hand, the ratio R2/R1 exceeding 0.9 leads to insufficient reinforcing effect around the upper end 6u of the first bead filler 6, decreasing the effect of improving the steering stability.

Preferably, in the pneumatic tire described above, the tire cross-sectional height SH is 135 mm or more, and is preferably in a range from 140 mm to 150 mm. As described above, pneumatic tires with relatively high tire cross-sectional height SH can provide the steering stability and ride comfort in a highly compatible manner.

EXAMPLES

For a pneumatic tire having a tire size of P235/65R17 103T including a tread portion extending in a tire circumferential direction and having an annular shape, a pair of sidewall portions respectively disposed on both sides of the tread portion, a pair of bead portions each disposed on an inner side of the pair of sidewall portions in a tire radial direction, a bead core extending in the tire circumferential direction and having an annular shape embedded in each of the bead portions, a first bead filler disposed on an outer circumference of the bead core, the carcass layer turned up from a tire inner side to an outer side around the bead core and the first bead filler at each of the bead portions, a second bead filler disposed on an outer side of a turned up portion of the carcass layer in a tire width direction, tires according to Comparative Examples 1 to 4 and according to Examples 1 to 9 were prepared with the height H1 of an upper end of the first bead filler, the hardness of the first bead filler, a ratio of the height H1 to the tire cross-sectional height SH, the cross-sectional area S1 of the first bead filler, the height H2 of the turned up end of the carcass layer, the height H3 of the upper end of the second bead filler, the thicknesses G1 to G3 of the second bead filler, the ratio G2/G1, the ratio G3/G1, the height H5 of the lower end of the second bead filler, the ratio of the height H5 to the height H1, the cross-sectional area S2 of the second bead filler, the hardness of the second bead filler, the height HP of the inflection point between the first arc and the second arc, the radius of curvature R1 of the first arc, the radius of curvature R2 of the second arc, the ratio R2/R1, the ratio S2/S1, the thickness G4 of the rim cushion rubber layer, the ratio G4/G1, the tire cross-sectional height SH, and the tire maximum width position set as in Table 1.

For comparison, a tire of Conventional Example that includes a first bead filler but does not include a second bead filler was prepared.

For these test tires, the steering stability (normal driving performance and high-speed lane changeability) and ride comfort (shock absorbing performance and vibration damping performance) are evaluated according to the following evaluation methods, and the evaluation results are shown in Table 1.

Steering Stability:

The test tires were assembled on wheels having a rim size of 17×7JJ, inflated to an air pressure of 240 kPa, and mounted on a test vehicle with displacement of 3500 cc. Sensory evaluation by a test driver was performed on the steering stability (normal driving performance, high-speed lane changeability). Evaluation results are expressed as index values with the value of the Conventional Example being defined as 100. Larger index values indicate superior steering stability.

Ride Comfort:

The test tires were assembled on wheels having a rim size of 17×7JJ, inflated to an air pressure of 240 kPa, and mounted on a test vehicle with displacement of 3500 cc. Sensory evaluation by a test driver was performed on the ride comfort (shock absorbing performance, vibration damping performance). Evaluation results are expressed as index values with the value of the Conventional Example being defined as 100. Larger index values indicate superior ride comfort.

TABLE 1-1

|  |  | Conventional Example | Comparative Example 1 | Comparative Example 2 |
|---|---|---|---|---|
| First bead filler | H1 (mm) | 50 | 30 | 12 |
|  | JIS-A hardness | 92 | 92 | 92 |
|  | H1/SH × 100% | 34 | 20 | 8 |
|  | Cross-sectional area S1 (cm$^2$) | 1.74 | 0.87 | 0.35 |

TABLE 1-1-continued

|  |  | Conventional Example | Comparative Example 1 | Comparative Example 2 |
|---|---|---|---|---|
| Carcass layer | H2 (mm) | 85 | 60 | 85 |
| Second bead filler | H3 (mm) | — | 40 | 60 |
|  | G1 (mm) | — | 2.0 | 2.0 |
|  | G2 (mm) | — | 1.5 | 1.5 |
|  | G3 (mm) | — | 1.0 | 1.0 |
|  | G2/G1 | — | 0.8 | 0.8 |
|  | G3/G1 | — | 0.5 | 0.5 |
|  | H5 (mm) | — | 27 | 27 |
|  | H5/H1 × 100% | — | 90 | 90 |
|  | Cross-sectional area S2 (cm$^2$) | — | 0.5 | 0.7 |
|  | JIS-A hardness | — | 72 | 72 |
| Arc | HP (mm) | — | — | — |
|  | R1 (mm) | — | 120 | 120 |
|  | R2 (mm) | — | — | — |
|  | R2/R1 | — | — | — |
| Cross-sectional area ratio S2/S1 |  | — | 0.6 | 2.0 |
| Rim cushion rubber layer | G4 (mm) | — | 3.0 | 3.0 |
|  | G4/G1 | — | 1.5 | 1.5 |
| Tire cross-sectional height SH (mm) |  | 147.7 | 147.7 | 147.7 |
| Tire maximum width position (mm) |  | 74 | 74 | 74 |
| Steering stability (index value) | Normal driving performance | 100 | 100 | 100 |
|  | High-speed lane changeability | 100 | 100 | 101 |
| Ride comfort (index value) | Shock absorbing performance | 100 | 98 | 101 |
|  | Vibration damping performance | 100 | 101 | 98 |

TABLE 1-2

|  |  | Comparative Example 3 | Comparative Example 4 | Example 1 |
|---|---|---|---|---|
| First bead filler | H1 (mm) | 30 | 30 | 30 |
|  | JIS-A hardness | 92 | 92 | 92 |
|  | H1/SH × 100% | 20 | 20 | 20 |
|  | Cross-sectional area S1 (cm$^2$) | 0.87 | 0.87 | 0.87 |
| Carcass layer | H2 (mm) | 85 | 85 | 85 |
| Second bead filler | H3 (mm) | 60 | 60 | 60 |
|  | G1 (mm) | 2.0 | 2.0 | 2.0 |
|  | G2 (mm) | 0.8 | 1.8 | 1.5 |
|  | G3 (mm) | 0.6 | 1.4 | 1.0 |
|  | G2/G1 | 0.4 | 0.9 | 0.8 |
|  | G3/G1 | 0.3 | 0.7 | 0.5 |
|  | H5 (mm) | 27 | 27 | 27 |
|  | H5/H1 × 100% | 90 | 90 | 90 |
|  | Cross-sectional area S2 (cm$^2$) | 0.3 | 0.9 | 0.7 |
|  | JIS-A hardness | 72 | 72 | 72 |
| Arc | HP (mm) | — | — | — |
|  | R1 (mm) | 120 | 120 | 120 |
|  | R2 (mm) | — | — | — |
|  | R2/R1 | — | — | — |
| Cross-sectional area ratio S2/S1 |  | 0.3 | 1.0 | 0.8 |
| Rim cushion rubber layer | G4 (mm) | 3.0 | 3.0 | 3.0 |
|  | G4/G1 | 1.5 | 1.5 | 1.5 |
| Tire cross-sectional height SH (mm) |  | 147.7 | 147.7 | 147.7 |
| Tire maximum width position (mm) |  | 74 | 74 | 74 |
| Steering stability (index value) | Normal driving performance | 100 | 101 | 101 |
|  | High-speed lane changeability | 99 | 101 | 101 |
| Ride comfort (index value) | Shock absorbing performance | 98 | 98 | 100 |
|  | Vibration damping performance | 100 | 101 | 101 |

TABLE 1-3

|  |  | Example 2 | Example 3 | Example 4 | Example 5 |
|---|---|---|---|---|---|
| First bead filler | H1 (mm) | 30 | 30 | 30 | 30 |
|  | JIS-A hardness | 92 | 92 | 92 | 92 |
|  | H1/SH × 100% | 20 | 20 | 20 | 20 |
|  | Cross-sectional area S1 (cm$^2$) | 0.87 | 0.87 | 0.87 | 0.87 |

TABLE 1-3-continued

|  |  | Example 2 | Example 3 | Example 4 | Example 5 |
|---|---|---|---|---|---|
| Carcass layer | H2 (mm) | 85 | 85 | 85 | 85 |
| Second bead filler | H3 (mm) | 60 | 60 | 60 | 70 |
|  | G1 (mm) | 2.0 | 2.0 | 2.0 | 2.0 |
|  | G2 (mm) | 1.5 | 1.5 | 1.5 | 1.5 |
|  | G3 (mm) | 1.0 | 1.0 | 1.0 | 1.0 |
|  | G2/G1 | 0.8 | 0.8 | 0.8 | 0.8 |
|  | G3/G1 | 0.5 | 0.5 | 0.5 | 0.5 |
|  | H5 (mm) | 27 | 27 | 27 | 27 |
|  | H5/H1 × 100% | 90 | 90 | 90 | 90 |
|  | Cross-sectional area S2 (cm$^2$) | 0.7 | 0.7 | 0.7 | 0.9 |
|  | JIS-A hardness | 72 | 72 | 72 | 72 |
| Arc | HP (mm) | 35 | 35 | 35 | 35 |
|  | R1 (mm) | 120 | 120 | 120 | 120 |
|  | R2 (mm) | 50 | 110 | 70 | 70 |
|  | R2/R1 | 0.42 | 0.92 | 0.58 | 0.58 |
| Cross-sectional area ratio S2/S1 |  | 0.8 | 0.8 | 0.8 | 1.0 |
| Rim cushion rubber layer | G4 (mm) | 3.0 | 3.0 | 3.0 | 3.0 |
|  | G4/G1 | 1.5 | 1.5 | 1.5 | 1.5 |
| Tire cross-sectional height SH (mm) |  | 147.7 | 147.7 | 147.7 | 147.7 |
| Tire maximum width position (mm) |  | 74 | 74 | 74 | 74 |
| Steering stability (index value) | Normal driving performance | 104 | 104 | 104 | 108 |
|  | High-speed lane changeability | 100 | 104 | 104 | 108 |
| Ride comfort (index value) | Shock absorbing performance | 101 | 102 | 103 | 103 |
|  | Vibration damping performance | 101 | 102 | 103 | 104 |

TABLE 1-4

|  |  | Example 6 | Example 7 | Example 8 | Example 9 |
|---|---|---|---|---|---|
| First bead filler | H1 (mm) | 30 | 30 | 30 | 30 |
|  | JIS-A hardness | 92 | 92 | 92 | 92 |
|  | H1/SH × 100% | 20 | 20 | 20 | 20 |
|  | Cross-sectional area S1 (cm$^2$) | 0.87 | 0.87 | 0.87 | 0.87 |
| Carcass layer | H2 (mm) | 85 | 85 | 85 | 85 |
| Second bead filler | H3 (mm) | 70 | 70 | 70 | 70 |
|  | G1 (mm) | 2.0 | 3.0 | 3.0 | 3.0 |
|  | G2 (mm) | 1.5 | 2.0 | 2.0 | 2.0 |
|  | G3 (mm) | 1.0 | 1.5 | 1.5 | 1.5 |
|  | G2/G1 | 0.8 | 0.7 | 0.7 | 0.7 |
|  | G3/G1 | 0.5 | 0.5 | 0.5 | 0.5 |
|  | H5 (mm) | 20 | 20 | 20 | 20 |
|  | H5/H1 × 100% | 67 | 67 | 67 | 67 |
|  | Cross-sectional area S2 (cm$^2$) | 0.9 | 1.2 | 1.2 | 1.2 |
|  | JIS-A hardness | 72 | 72 | 72 | 92 |
| Arc | HP (mm) | 35 | 35 | 35 | 35 |
|  | R1 (mm) | 120 | 120 | 120 | 120 |
|  | R2 (mm) | 70 | 70 | 70 | 70 |
|  | R2/R1 | 0.58 | 0.58 | 0.58 | 0.58 |
| Cross-sectional area ratio S2/S1 |  | 1.0 | 1.4 | 1.4 | 1.4 |
| Rim cushion rubber layer | G4 (mm) | 3.0 | 3.0 | 2.5 | 2.5 |
|  | G4/G1 | 1.5 | 1.0 | 0.8 | 0.8 |
| Tire cross-sectional height SH (mm) |  | 147.7 | 147.7 | 147.7 | 147.7 |
| Tire maximum width position (mm) |  | 74 | 74 | 74 | 74 |
| Steering stability (index value) | Normal driving performance | 108 | 116 | 116 | 124 |
|  | High-speed lane changeability | 108 | 116 | 124 | 132 |
| Ride comfort (index value) | Shock absorbing performance | 103 | 103 | 103 | 103 |
|  | Vibration damping performance | 104 | 104 | 104 | 105 |

As can be seen from Table 1, compared with Conventional Example, with the tires of Examples 1 to 9, the steering stability and the ride comfort were improved in a well-balanced manner. On the other hand, with the tire of Comparative Example 1, the effect of improving the steering stability was not acquired due to the turned up end of the carcass layer being disposed on the inner side of the tire maximum width position in the tire radial direction. In the tire of Comparative Example 2, the effect of improving the steering stability was not acquired due to the height H1 of the upper end of the first bead filler being excessively small. In the tire of Comparative Example 3, the effect of improving the steering stability was not acquired due to the thicknesses G2 and G3 of the second bead filler being insufficient relative to the thickness G1. In the tire of Comparative Example 4, the effect of improving the ride comfort was not acquired due to the thicknesses G2 and G3 of the second bead filler being too large relative to the thickness G1.

The invention claimed is:
1. A pneumatic tire, comprising:
a tread portion extending in a tire circumferential direction and having an annular shape;
a pair of sidewall portions respectively disposed on both sides of the tread portion;

a pair of bead portions each disposed on an inner side of the pair of sidewall portions in a tire radial direction;

a bead core extending in the tire circumferential direction and having an annular shape embedded in each of the bead portions;

a first bead filler disposed on an outer circumference of the bead core;

a carcass layer turned up from a tire inner side to a tire outer side around the bead core and the first bead filler at each of the bead portions; and a second bead filler disposed on an outer side of a turned up portion of the carcass layer in a tire width direction;

a height H1 of an upper end of the first bead filler in the tire radial direction ranging from 10% to 30% of a tire cross-sectional height SH, a turned up end of the carcass layer being disposed on an outer side of a tire maximum width position in the tire radial direction, an upper end of the second bead filler being disposed between the upper end of the first bead filler and the turned up end of the carcass layer in the tire radial direction, the second bead filler having a shape tapered toward the outer side in the tire radial direction, the second bead filler being thickest at a position of the upper end of the first bead filler, and a thickness G1 of the second bead filler at the position of the upper end of the first bead filler, a thickness G2 of the second bead filler at a position corresponding to one-half of a height H4 in the tire radial direction from the upper end of the first bead filler to the upper end of the second bead filler, and a thickness G3 of the second bead filler at a position corresponding to three-fourths of the height H4 in the tire radial direction from the upper end of the first bead filler to the upper end of the second bead filler satisfy relationships $0.5 \leq G2/G1 \leq 0.8$ and $0.4 \leq G3/G1 \leq 0.6$; wherein an outer side surface of the second bead filler includes, in a tire meridian cross-section, a first arc and a second arc projecting toward the outer side in the tire width direction, a height HP of an inflection point between the first arc and the second arc in the tire radial direction with respect to the height H1 of the upper end of the first bead filler in the tire radial direction and the height H2 of the turned up end of the carcass layer in the tire radial direction satisfies a relationship $H1 \leq HP \leq H2/2$, and a radius of curvature R1 of the first arc positioned on the outer side in the tire radial direction is larger than a radius of curvature R2 of the second arc positioned on the inner side in the tire radial direction.

2. The pneumatic tire according to claim 1, wherein a height H5 of a lower end of the second bead filler in the tire radial direction ranges from 50% to 75% of the height H1 of the upper end of the first bead filler in the tire radial direction.

3. The pneumatic tire according to claim 1, wherein the thickness G1 of the second bead filler at the position of the upper end of the first bead filler is 3.0 mm or more.

4. The pneumatic tire according to claim 1, wherein a cross-sectional area S2 of the second bead filler with respect to a cross-sectional area S1 of the first bead filler satisfies a relationship $1.1 \leq S2/S1 \leq 1.5$.

5. The pneumatic tire according to claim 1, wherein a rim cushion rubber layer is disposed on the outer side of the turned up portion of the carcass layer and the second bead filler in the tire width direction, and a thickness G4 of the rim cushion rubber layer at the position of the upper end of the first bead filler with respect to the thickness G1 of the second bead filler at the position of the upper end of the first bead filler satisfies a relationship $0.5 \leq G4/G1 \leq 1.0$.

6. The pneumatic tire according to claim 1, wherein JIS-A hardness of each of the first bead filler and the second bead filler ranges from 72 to 96.

7. The pneumatic tire according to claim 1, wherein the radius of curvature R2 of the second arc with respect to the radius of curvature R1 of the first arc satisfies a relationship $0.5 \leq R2/R1 \leq 0.9$.

8. The pneumatic tire according to claim 1, wherein the tire cross-sectional height SH is 135 mm or more.

9. The pneumatic tire according to claim 1, wherein a height H3 of the upper end of the second bead filler in the tire radial direction with respect to the height H1 of the upper end of the first bead filler in the tire radial direction and the height H2 of the turned up end of the carcass layer in the tire radial direction satisfies a relationship $H3 > (H1+H2)/2$.

10. The pneumatic tire according to claim 9, wherein a height H5 of a lower end of the second bead filler in the tire radial direction ranges from 50% to 75% of the height H1 of the upper end of the first bead filler in the tire radial direction.

11. The pneumatic tire according to claim 10, wherein the thickness G1 of the second bead filler at the position of the upper end of the first bead filler is 3.0 mm or more.

12. The pneumatic tire according to claim 10, wherein a cross-sectional area S2 of the second bead filler with respect to a cross-sectional area S1 of the first bead filler satisfies a relationship $1.1 \leq S2/S1 \leq 1.5$.

13. The pneumatic tire according to claim 12, wherein a rim cushion rubber layer is disposed on the outer side of the turned up portion of the carcass layer and the second bead filler in the tire width direction, and a thickness G4 of the rim cushion rubber layer at the position of the upper end of the first bead filler with respect to the thickness G1 of the second bead filler at the position of the upper end of the first bead filler satisfies a relationship $0.5 \leq G4/G1 \leq 1.0$.

14. The pneumatic tire according to claim 13, wherein JIS-A hardness of each of the first bead filler and the second bead filler ranges from 72 to 96.

15. The pneumatic tire according to claim 14, wherein the radius of curvature R2 of the second arc with respect to the radius of curvature R1 of the first arc satisfies a relationship $0.5 \leq R2/R1 \leq 0.9$.

16. The pneumatic tire according to claim 15, wherein the tire cross-sectional height SH is 135 mm or more.

\* \* \* \* \*